Jan. 3, 1961

D. STEEN 2,966,802

PISTON-TYPE CAPACITANCE ACCELEROMETER

Filed June 7, 1954

INVENTOR:
Douglas Steen
By Hubert E. Metcalf
His Patent Attorney

United States Patent Office 2,966,802
Patented Jan. 3, 1961

2,966,802

PISTON-TYPE CAPACITANCE ACCELEROMETER

Douglas Steen, Los Angeles, Calif., assignor to Northrop Corporation, a corporation of California Filed June 7, 1954, Ser. No. 434,766

13 Claims. (Cl. 73—516)

The present invention relates to accelerometers, and more particularly, to a capacitance type accelerometer having an exceptionally large dynamic range of operation.

In the pilotless aircraft guidance field, for example, there is a great need for better accelerometers which are accurate, relatively simple, small in size, insensitive to temperature change, linear in operation, and which have a large operating range from the minimum acceleration measurable to the maximum acceleration measurable. Accordingly, it is an object of this invention to provide a capacitance accelerometer of the required accuracy and sensitivity to applied accelerations, while at the same time having a larger dynamic range of operation than heretofore possible.

Further, since a craft of the above noted type requires an accelerometer with a large number of specifications, it is another object of the present invention to provide a capacitance accelerometer having an added parameter which makes possible a more versatile instrument easily adjustable to produce models capable of satisfying a variety of different conditions.

These objects and others ancillary thereto, will be pointed out in the detailed description of a specific embodiment of the invention forming a later part of this specification.

Briefly, my invention comprises a spring-suspended mass, preferably cylindrical, movable in its axial direction in response to accelerations of the case in which it is mounted. In the accelerometer art, such a mass movable or otherwise responsive to accelerations to be measured, is commonly called the "proof mass." A cylindrical portion of the case surrounds the proof mass coaxially. Rigid conductive inner end surfaces of the case are parallel to and separated from conductive end faces of the proof mass by a dielectric. A variable capacitor is thus formed at each end of the proof mass when proper electrical connections are made, such that when the proof mass moves, the capacity of one capacitor increases while the capacity of the other decreases.

A very small clearance is provided between the outer diameter of the proof mass and the inner diameter of the surrounding housing, and a damping fluid, which forms the dielectric material, substantially fills the entire instrument. The proof mass itself is relatively thick and during its movement displaces the damping fluid solely through the aforementioned restricted clearance space.

The present invention is an improvement on an accelerometer which is shown, described, and claimed in a copending U.S. application, Serial No. 447,304, filed August 2, 1954, now abandoned, by Hindall et al., and assigned to the assignee of the present application.

This invention will be more fully understood by reference to the accompanying drawings showing an illustrative embodiment thereof.

Figure 3:
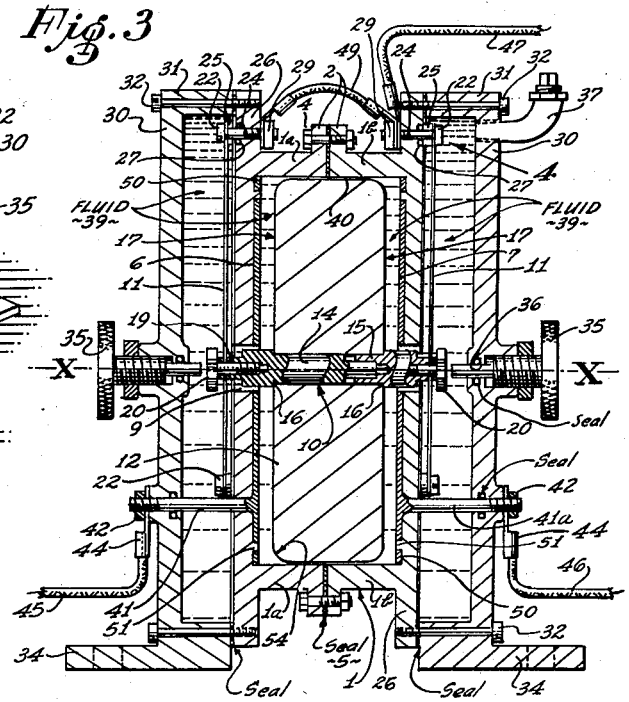
Figure 3 is a cross sectional view taken as indicated by line 3—3 in Figure 2, showing the principal arrangements of parts constituting the present invention.

Referring mainly to Figure 3 for a detailed description of my invention, the accelerometer has a cylindrical housing 1 made in two identical halves 1a and 1b fastened together at a central flange 2 by housing bolts 4 and made fluid tight at this juncture by a housing seal 5. Housing 1 is made of insulating material, and each half has a conductive circular plate 6 and 7, respectively, secured to the parallel end faces within the housing. The plates 6 and 7 as well as the ends of the housing 1 are provided with a central aperture 9 at the longitudinal axis X—X. Along the axis is positioned a conductive rod assembly 10 supported equidistant from the edges of the aperture 9 by a spring suspension unit 11 at each outside end of the housing 1.

A centrally apertured piston 12 is rigidly secured to rod assembly 10 and operates within the housing 1. A first threaded end 14 and a second threaded end 15 of rod assembly 10 are screwed together from opposite sides of the piston 12, with shoulders 16 on the threaded ends seating against the piston faces. Both faces 17 of the piston 12 are metallic, and in this preferred embodiment the entire piston is electrically conductive, so that the opposite piston faces 17 are always at the same potential.

A substantial space exists in the aperture 9 between the housing plate 6 or 7, and the rod assembly 10, so that the plates do not contact the rod. Thus, one capacitor is formed by the left-hand plate 6 and the left-hand face of the piston 12, while a second capacitor is formed by the right-hand piston face and the right-hand plate 7. Electrical connections for these capacitors will be described later.

Figure 2:
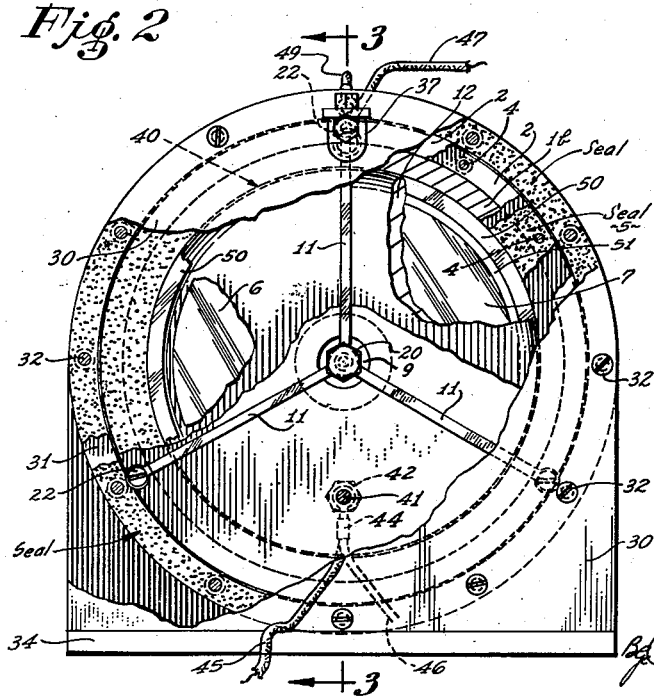
Figure 2 is an end view having cut away portions showing various internal components.
Figure 4:
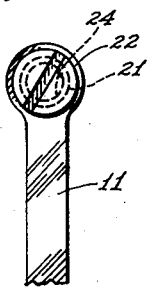
Figure 4 is an enlarged internal end view of the portion as indicated by arrow 4 in Figure 3, showing details of a suspension unit adjustable mounting.

The spring suspension unit 11 at each end of the housing 1 comprises a flat Y-shaped strip of thin but relatively wide spring material having a center hole which engages a reduced diameter portion 19 of the rod assembly 10 and is secured thereon by a threaded stud 20. As shown in Figures 2, 3, and 4, the three outer ends of the suspension unit 11 are equally spaced 120° apart and each has an enlarged hole 21 through which a mounting screw 22 passes to attach to the housing 1. The shank 24 of the screw is substantially smaller than the hole 21 in the suspension strip to allow for adjustment of the piston 12 to an exactly coaxial position with the housing 1. A spacer 25 is installed under the suspension strip to hold the suspension unit 11 outwardly from the ends of the housing 1. The mounting screws 22 pass through an outer flange 26 of the housing, where an O-ring 27 is provided, and nuts 29 are installed on the screws externally of the accelerometer.

An outer end casing 30 is fitted onto each end of the housing 1 and comprises a circular projecting rim 31 adapted to contact and be sealed against the housing outer flange 26 outwardly from the suspension mounting screws 22. Rim screws 32 hold each end casing 30 to the housing 1. The end casings 30 are also made of nonconductive material. Each end casing 30 has an extended base 34 which provides support and mounting means for the accelerometer.

Figure 1:
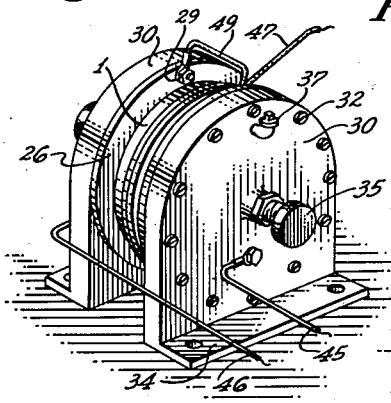
Figure 1 is a perspective view showing the exterior of the present accelerometer.

An adjustable stop screw 35 (Figures 1 and 3) is threadably mounted in the center of each end casing 30. It extends inwardly through a sealed opening 36 in the end casing 30, and ends in blocking position opposite the head of the threaded stud 20, to prevent axial travel of the rod assembly 10 beyond a predetermined point from null.

One end casing 30 has filler means 37 through which the entire inside of the accelerometer is filled with a dielectric fluid 39. Specifications for this fluid 39 will be discussed later. As acceleration takes place along the longitudinal axis X—X of the instrument, the piston 12 is displaced by inertia along this axis, forcing the contained fluid 39 to be displaced from one side of the piston 12 through a small annular space 40 between the piston and the housing 1, to the other side of the piston. The suspension unit 11 permits axial movement of the piston 12 to occur with a small centering force, but does not allow radial movement of the piston, since the Y-shaped strips are essentially rigid in that direction.

An electrical connection to the left-hand capacitor plate 6 is made by a post 41 welded or otherwise secured to the left-hand plate 6 and extending outwardly through the insulated housing half 1a and the left-hand end casing 30. A terminal nut 42 and fitting 44 on the exposed end of post 41 provides for a first lead 45 to be connected in a suitable electrical circuit. A similar post 41a is attached to the right-hand plate 7 to provide connection means for a second electrical lead 46. For the movable capacitor plates (piston faces 17), electrical continuity is provided through the piston 12, rod assembly 10, and both spring suspension units 11, to the top mounting screws 22. A third lead 47 is connected under one of the mounting nuts 29 to lead externally, and a short jumper 49 may be connected between both of the suspension units 11 to assure an accurate electrical connection to the piston 12.

Thus, one variable capacitor in this accelerometer is connected directly to the other, and the three leads 45, 46, and 47 may be connected in a bridge circuit or other suitable means for detecting the motion of the proof mass, or piston 12.

The left and right-hand plates 6 and 7 of a preferred embodiment are smaller in diameter than the interior of their housings, as shown in Figure 3. A metallic guard ring 50 is installed around the circumference of each plate and separated therefrom by a small ridge 51 of the non-conductive housing 1. The rings 50 are not electrically connected to any parts of the accelerometer. Their function is to assure a constant and parallel electric field between each piston face and the corresponding capacitor plate, by straightening the curved lines of force normally occurring at the edges of parallel capacitor plates. The guard ring construction acts to increase static linearity. The same construction may be incorporated in the piston faces 17 also, if desired.

In the above referenced application, Hindall et al. have disclosed a closed loop, capacitance accelerometer having an electrostatic force balancing means for producing a restoring force on the proof mass linearly proportional to the output voltage taken from the system. The present accelerometer may be used in that system or others, as desired.

Various properties of the accelerometer in operation, such as the time constant, damping coefficient, spring constant, dynamic range of operation, and the like, are adjustable by varying the numerous dimensions of the unit and by selection of different dielectric fluids. If the accelerometer is used in the system of the above referenced copending application, the electrostatic, output-produced, centering force will furnish almost all the total restoring force on the proof mass, with the spring suspension unit 11 providing very little of the total. Therefore, motion of the proof mass in actual operation in one embodiment is limited to about one thousandth of an inch, and the stop screws 35 can be set very close to the rod assembly 10. This implies a large electrostatic spring constant, and the damping coefficient (annulus governed) must be commensurately high if a long time constant is to be achieved, the time constant being a measure of the time required for the output voltage (or other output signal) to come to a substantially steady value after any constant acceleration is applied.

The present accelerometer may also be used in an open loop system, wherein the output signal does not by itself generate any restoring force. The problems become somewhat different depending upon the overall system, but the advantages of the present design are still obtained, and are explained in the following paragraphs.

By making the annular clearance space 40 between the piston 12 and the housing 1 very small, a restriction is provided to the flow of fluid 39 displaced from one side to the other when the accelerometer responds to a change in acceleration. This of course influences the viscous damping coefficient. Ordinarily, the damping coefficient would be dependent only upon the viscosity of the fluid, radius of the proof mass (piston 12), and, in the case of the above referenced application, the distance from the proof mass at null to the end wall of the housing which is the fixed plate of the capacitor. With the present invention, the determination of the size of the clearance space 40, and of the piston thickness, provides two additional parameters with which to work when designing an accelerometer to a given set of specifications. Since damping takes place almost entirely in the annular space 40, rather than across the faces 17 of the piston 12, the distance from the piston at null to the plates 6 and 7 affects the spring constant but does not enter into the damping calculations. However, both the annulus size and piston thickness do.

As a consequence, it has been found that the provision of the damping in the small annular space 40 will allow a very high dynamic range of operation while still maintaining the other requirements by which the operation of the accelerometer is defined, i.e., linearity, high maximum acceleration, spatial restrictions on geometry and time constant as desired. Even under spatial restrictions, a dynamic range of 40,000 to 100,000 can be achieved, where this figure represents the ratio of the maximum acceleration to be measured to the minimum acceleration measurable above any "noise." In the cylindrically symmetric force balance accelerometer, the dynamic range, D, is approximated by the equation $$D = \frac{KR^2 Z_{max}}{4d^2 \Delta C}$$

where K is the dielectric constant of the fluid 39, R is the radius of the proof mass, $\Delta C$ is the noise level in the capacitance detection circuit, $Z_{max}$ is the maximum permitted proof mass displacement from null, $d$ is the distance from the proof mass at null to the fixed plate, and where the above enumerated operational requirements restrict the choice of these parameters. The above performance is also realized with a minimized temperature sensitivity, as follows.

In the above equation, for a fixed $d$, the D and K are in linear relation. It can be shown mathematically that if fixed requirements are to be met, the use of a minimal fluid viscosity is commensurate with the use of a high fluid dielectric constant in the present invention, but with a low dielectric constant in a previous capacitance accelerometer not having the annular space restriction for damping. A high dielectric constant, moderate viscosity fluid is unable in the previous design to provide at least the critical amount of viscous damping or to satisfy the time constant requirements. A fluid of high viscosity (150 poises, for example) might supply the damping and range requisites, but such a fluid would render the accelerometer excessively sensitive to temperature changes.

A critical element in these considerations is the damping fluid. For a capacitance accelerometer, the fluid is required to have (1) a high dielectric constant, (2) a high breakdown potential, and (3) a low or moderate viscosity (in order to be relatively temperature independent).

Therefore, it is the present device, alone, which is favored by maximal dielectric constant, in that its dynamic range is greatly increased and its temperature sensitivity is greatly decreased.

In one specific design for a spatially compact, cylindrical accelerometer having a range D of 100,000 and a time constant of about 10 seconds, the following order of values is preferred.

$Z_{max}$=0.00025 cm.
$d$=0.05 cm.
$R$=2.0 cm.
$H$=0.54 cm.
$y$=0.001 cm.
$k$=200,000 dynes per cm.
$\Delta C$=0.0001 cm.
$K$=100
$u$=0.05 poise where K, R, $\Delta C$, $Z_{max}$, and $d$ have previously been defined, H is the thickness or height of the piston 12 along the operational axis, $y$ is the radial separation distance of the piston exterior from the housing interior (annular space 40), $k$ is the electrical spring constant, and $u$ is the viscosity of fluid 39.

For the damping fluid itself, dimethyl formamide may be used, with a small amount of glycol added to bring the viscosity to .05. Another fluid having the requisite high dielectric constant is hydrocyanic acid. Any desired time constant is obtainable by varying the ratio of amount of damping to spring constant.

In the manufacture of the piston 12, a radius 54 of about the proportion shown in Figure 3 is preferred at the edges. Since the annular space 40 is very small, accurate adjustment of the suspension is required, and the machining of the piston diameter and housing interior diameter must be held to close tolerances, especially at the regions near the ends of the piston, so the damping action will be satisfactory in each direction. Because fluid motion is at an extremely low velocity, no detrimental effects of turbulence occur.

It is thus seen that the present invention enables a larger dynamic operating range than previously possible. In addition, this accelerometer is very flexible in design, as shown herein, so that almost any dynamic equation of motion can be obtained. The flexibility obviously allows a variety of modifications to be made within the scope of this invention. For example, if space is not a problem, the diameter of the piston 12 can be increased to provide even larger values of D. Or, lower values of K, say around 10, will be found suitable for many purposes. The physical housing structure may also be altered as desired. Instead of having the fluid occupy the whole interior of the end casings 30, a flexible diaphragm can be incorporated across the aperture 9 near each end of the rod assembly 10 to confine the fluid 39 entirely within the housing 1.

As shown hereinbefore, the added parameter $y$, or the annular space 40, permits the use of relatively inviscid damping fluids having a high dielectric constant. No disadvantages or theoretical drawbacks are incurred. The same damping arrangement may obviously be also used in other types of accelerometers.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A capacitance accelerometer comprising a housing, a proof mass, suspension means connected to said housing and supporting said proof mass within said housing to be movable only along a longitudinal axis of said accelerometer, an inner perimeter of said housing and an outer perimeter of said proof mass extending parallel to said axis and being spaced by a minute clearance space, said housing encompassing said proof mass completely except for an axial opening through said housing for said suspension means, the end faces of said proof mass being electrically conductive to each form one plate of a capacitor, an apertured conductive plate fixed to each inner end of said housing opposite said end faces, respectively, to form with said end faces a pair of capacitors, said apertured plates being electrically insulated from each other, said suspension means being elastic to bias said proof mass to a null position where said proof mass is equidistant from said apertured plates, means preventing flow of fluid outwardly from the opening at each end of said housing, a damping fluid filling the interior of said housing around said proof mass, and means for respectively connecting external electrical leads to each of said apertured plates and to said end faces.

2. Apparatus in accordance with claim 1 wherein said damping fluid has a dielectric constant of at least 10, and a relatively low viscosity.

3. Apparatus in accordance with claim 1 wherein said elastic suspension means has adjustable positioning means to permit accurate alignment of said proof mass coaxial with said housing.

4. Apparatus in accordance with claim 1 wherein said housing and said proof mass are cylindrical and wherein the axial dimension of said proof mass is greater than .10 times its diameter.

5. Apparatus in accordance with claim 1 wherein said suspension means comprises an axial, conductive rod member extending from said proof mass outwardly through said apertured conductive plates without contacting said plates, and a Y-shaped conductive flat spring suspension element at each end of said rod member, the centers of said spring elements secured respectively to said rod member ends, and the outer ends of said Y-shaped spring elements secured to said housing, and wherein said means for connecting an external electrical lead to said proof mass end faces includes an electrical connection to an outer end of at least one of said spring elements.

6. A capacitance accelerometer comprising a cylindrical housing, a cylindrical proof mass operable longitudinally within said housing, said proof mass having electrically conductive end faces, a conductive rod assembly secured coaxially to said proof mass and extending outwardly from both said end faces, a pair of conductive circular plates each insulatingly fixed in said housing and positioned opposite said end faces, respectively, to form a pair of capacitors which are variable in value as said proof mass moves longitudinally of said housing, said plates each having a central aperture through which said rod assembly extends without contacting said plates, suspension means attached to the ends of said rod assembly beyond said plates and to said housing to suspend said proof mass rigidly coaxial with said housing, said suspension means being elastic in said longitudinal direction to tend to restore said proof mass to a null position substantially equidistant from said circular plates, the outer circumference of said proof mass being spaced from the inner circumference of said housing by a small annular clearance space, fluid tight closure means connected to each end of said housing to prevent flow of fluid outwardly through said plate apertures, a filling of damping fluid in said housing surrounding said proof mass, and means for connecting three external electrical leads respectively to said two plates and to said proof mass, whereby longitudinal acceleration of said capacitor causes highly damped displacement of said proof mass due to restriction of fluid flow through said small annular space.

7. Apparatus in accordance with claim 6 wherein said damping fluid has a relatively high dielectric constant and a relatively low viscosity.

8. Apparatus in accordance with claim 6 wherein the longitudinal dimension of said proof mass exceeds .10 times its diameter, and wherein a substantial radius is provided on both edges of said proof mass.

9. Apparatus in accordance with claim 6 wherein said suspension means is adjustably attached to said housing to provide accurate alignment of said proof mass, and including longitudinally adjustable rigid stop means operatively mounted opposite each end of said rod assembly at a distance corresponding to a predetermined maximum operating displacement of said proof mass.

10. Apparatus in accordance with claim 6 wherein said damping fluid is a mixture of dimethyl formamide with a small amount of glycol.

11. In a capacitance accelerometer, the combination of a cylindrical housing, a solid cylindrical piston-type proof mass movable axially within said housing, said proof mass being suspended in said housing with only a small, restrictive annular clearance between the outer circumference of said proof mass and the inner circumference of said housing, a fixed capacitor plate opposite and closely adjacent each end of said proof mass, said proof mass having a length greater than .10 times its diameter, and a filling of high dielectric constant, low viscosity, damping fluid in said housing surrounding said proof mass.

12. Apparatus in accordance with claim 11 including substantially rounded outer edges on said proof mass and a conductive guard ring coplanar with and spaced outwardly from each of said capacitor plates, said guard rings being insulated from said capacitor plates.

13. Apparatus in accordance with claim 11 wherein said damping fluid is dimethyl formamide containing a small amount of a relatively higher viscosity fluid.

References Cited in the file of this patent

UNITED STATES PATENTS

| | | |
|---|---|---|
| 2,008,713 | Hayes | July 23, 1935 |
| 2,115,578 | Hall | Apr. 26, 1938 |
| 2,677,270 | Sanderson | May 4, 1954 |
| 2,711,590 | Wilcox | June 28, 1955 |